(No Model.)
O. EISENHUTH.
TAP COUPLING.
No. 568,432. Patented Sept. 29, 1896.
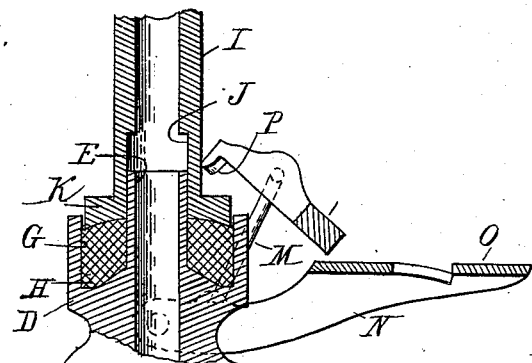
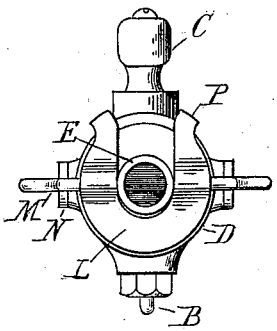
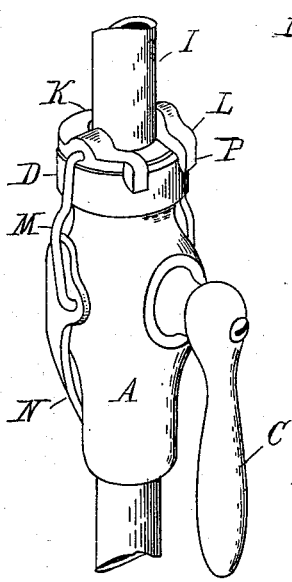
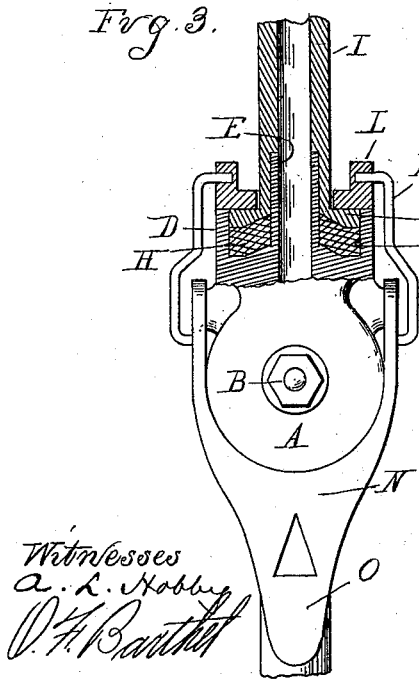
Witnesses
A. L. Hobby
O. F. Barthel
Inventor
Oscar Eisenhuth
By Mr. H. Sprague & Son
Attys.
THE NORRIS PETERS CO., PHOTO-LITHO., WASHINGTON, D. C.

United States Patent Office.

OSCAR EISENHUTH, OF DETROIT, MICHIGAN, ASSIGNOR TO DENIS J. REAUME, OF SAME PLACE.

TAP-COUPLING.

SPECIFICATION forming part of Letters Patent No. 568,432, dated September 29, 1896.

Application filed April 13, 1896. Serial No. 587,295. (No model.)

*To all whom it may concern:*

Be it known that I, OSCAR EISENHUTH, a citizen of the United States, residing at Detroit, in the county of Wayne and State of Michigan, have invented certain new and useful Improvements in Tap-Couplings, of which the following is a specification, reference being had therein to the accompanying drawings.

The invention relates to the construction of a beer-tap, and particularly in the construction of the coupling carried by the tap-valve casing for securing it to the discharge-pipe, all as more fully hereinafter described.

In the drawings, Figure 1 is a perspective view of such a tap embodying my invention. Fig. 2 is a side elevation, partly in section. Fig. 3 is a longitudinal vertical section on a line at right angles to the sectional portion of Fig. 2. Fig. 4 is a top plan view thereof.

A is the valve-casing. B is a plug-cock therein controlling the opening through the casing and having a suitable lever C. At one end this casing is provided with the enlarged cylindrical cup-shaped flange D, within which is the nipple E of lesser diameter and longer, so as to project out beyond the flange D at its outer end. The opening through this nipple is in line with the fluid-passage through the valve-casing. Between the flange D and nipple E is an annular packing-ring chamber G, in which is located the packing-ring H, preferably of rubber or similar material.

I is the discharge-pipe. This has the enlarged bore J at the lower end fitting nicely over the nipple, and the packing compression-flange K at its lower end fitting over the packing-ring, its outer edge fitting within the flange D.

L is a yoke adapted to embrace the pipe I above the flange K, and which acts as a clamping-yoke, being drawn down upon the flange K through the links M and lever N. This lever is bifurcated to embrace the end of the plug-valve, and has a finger-piece O extending down beside the valve-casing. The links are so hinged that when the lever is in the position shown in Fig. 1 the pivotal point of the link will be beyond the middle and thus act to lock the parts.

P are guide-fingers on the end of the yoke, adapted to engage over the side of the flange D and prevent the disengagement of the yoke as the lever is turned down. These guide-fingers I deem of considerable importance, as without them it is always necessary to hold the yoke in position with one hand while turning the lever with the other, and it frequently happens that the yoke will catch a portion of the fingers holding it and pinch them. These guide-fingers permit the operation of the device with one hand.

The projection of the nipple beyond the flange D aids in quickly engaging the pipe thereon and acts to guide the flange K.

The function and operation of the device I deem sufficiently explained.

What I claim as my invention is—

1. The combination of the valve-casing, the enlarged cylindrical flange D at one end thereof, the concentric nipple E extending out beyond the end of the flange D, the pipe I having the compression-flange K adapted to occupy the annular space between the flange and nipple, a packing-ring in said space, a yoke embracing the pipe I and engaging said flange K, a lever and links connected to the lever and pivoted to said yoke, substantially as described.

2. The combination of the casing, a pipe in alinement therewith, means for guiding and holding said pipe and casing in proper relation to each other, a shoulder on the pipe, a yoke engaging said shoulder, guide-fingers P on said yoke, a lever, and links pivoted to the yoke and connected to the lever, substantially as described.

In testimony whereof I affix my signature in presence of two witnesses.

OSCAR EISENHUTH.

Witnesses:
M. B. O'DOGHERTY,
JAS. WHITTEMORE.